Figure 1:
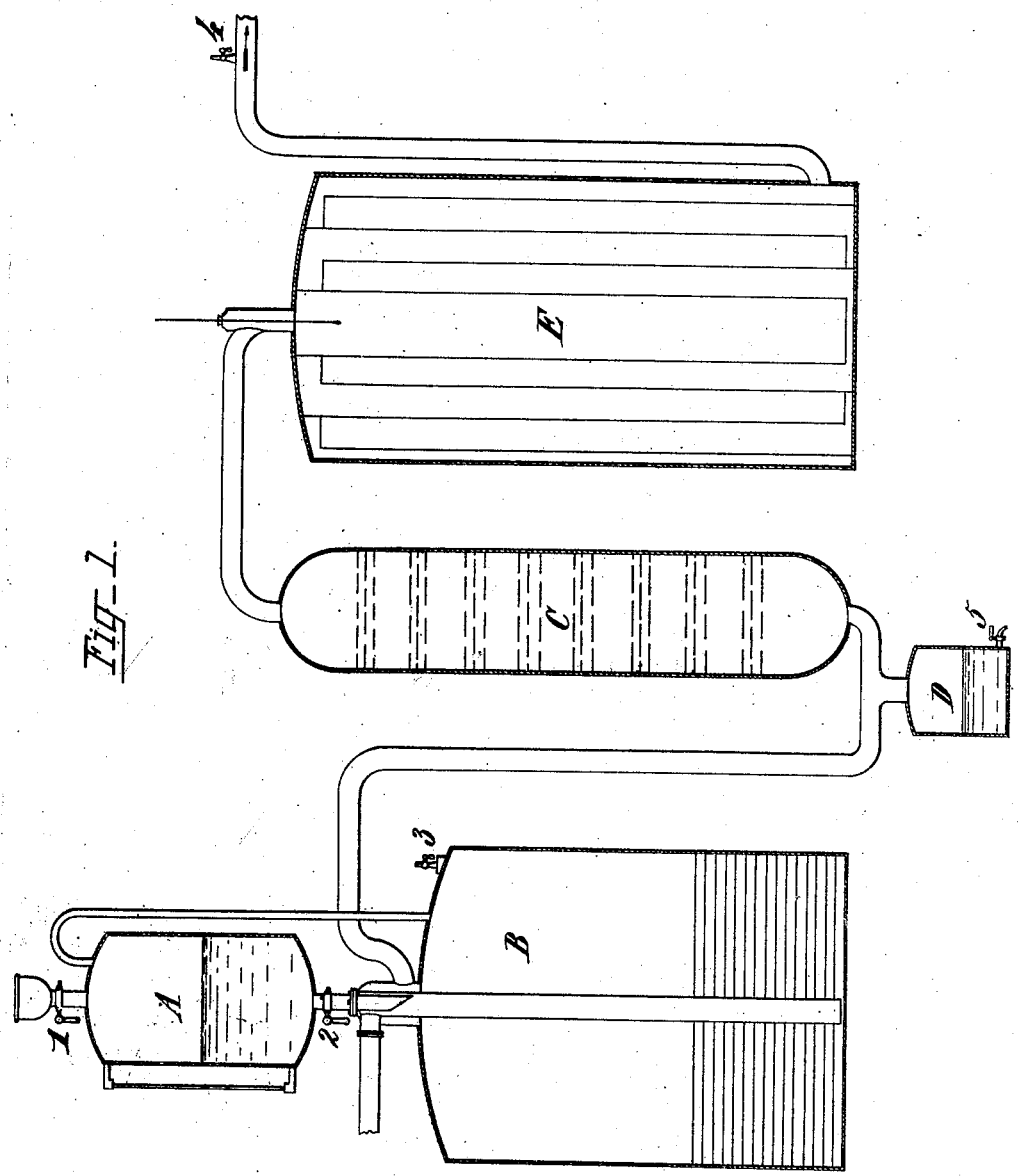
Figure 2:
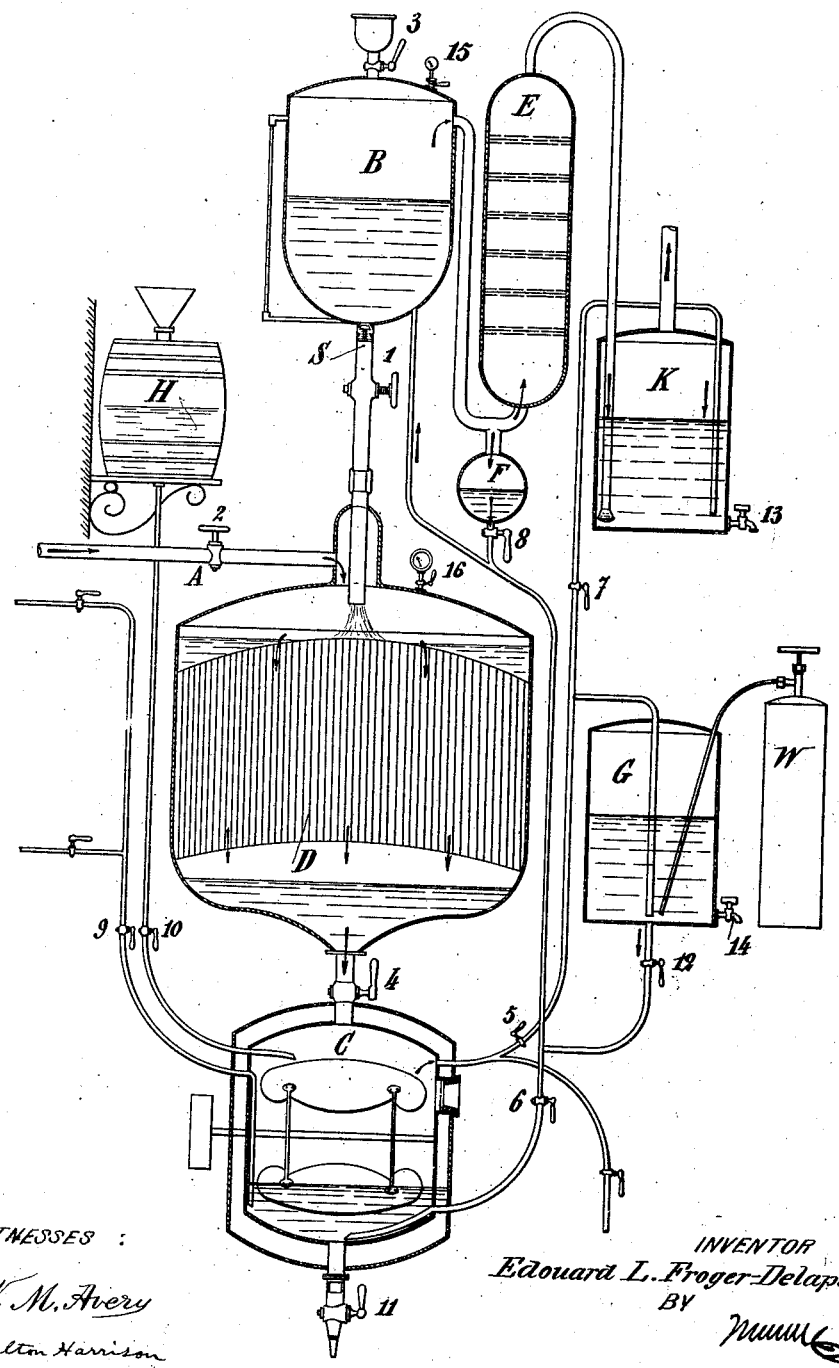

No. 841,957. PATENTED JAN. 22, 1907.
E. L. FROGER-DELAPIERRE.
PROCESS OF MAKING VANILLIN.
APPLICATION FILED JUNE 26, 1902.

2 SHEETS—SHEET 1.

WITNESSES:
W. M. Avery
Walton Harrison

INVENTOR
Edouard L. Froger-Delapierre
BY
ATTORNEYS

No. 841,957.

PATENTED JAN. 22, 1907.

E. L. FROGER-DELAPIERRE.
PROCESS OF MAKING VANILLIN.
APPLICATION FILED JUNE 26, 1902.

2 SHEETS—SHEET 2.

WITNESSES:
W. M. Avery
Walton Harrison

INVENTOR
Edouard L. Froger-Delapierre
BY
ATTORNEYS.

UNITED STATES PATENT OFFICE.

EDOUARD LOUIS FROGER-DELAPIERRE, OF COURBEVOIE, FRANCE.

PROCESS OF MAKING VANILLIN.

No. 841,957.    Specification of Letters Patent.    Patented Jan. 22, 1907.

Application filed June 26, 1902. Serial No. 113,270.

*To all whom it may concern:*

Be it known that I, EDOUARD LOUIS FROGER-DELAPIERRE, chemist, of 25 Rue de Belfort, Courbevoie, Seine, Republic of France, have invented a new and Improved Process for the Production of Aromatic Aldehydes Containing Free Phenol Groups, of which the following is a full, clear, and exact description.

The present invention has for its object a process for the production of vanillin or other aromatic aldehydes containing free phenol groups.

The new process is based upon the oxidizing action exerted by oxygen in presence of terpins, sesquiterpins, &c., upon phenols containing allyl groups or propenyl groups, or upon certain derivatives of such phenols with free phenol groups, such as clove-oil, eugenol, isoeugenol, and their analogues.

It is a well-known fact that terpins and their analogues have the property of activating or energizing oxygen and transferring it in this form to the bodies to be oxidized. In the present invention, then, this property is made use of to oxidize, for instance, the allyl group $CH_2-CH-CH_2$ of eugenol or the propenyl group $CH_3-CH-CH$ of isoeugenol. The same would be the case with the other analogous compounds.

The process differs from other similar ones proposed for analogous purposes in that while with the latter the oxygen is used in the shape of ozone this is not the case here, since it is known that the terpins, &c., do not convert oxygen into the form of ozone, whose presence is rather excluded, because it cannot exist in presence of terpin-vapors.

By substituting oxygen energized or activated by terpins, &c., for ozone the advantage is obtained that the oxidation stops with the conversion of the allyl group or the propenyl group into the aldehyde group, while with other processes when the reaction has advanced to a certain percentage of aldehyde formation there is a further action, with partial resinification. This resinification it was heretofore possible to prevent only by introducing before the oxidation certain substituents into the phenol group—for instance, by first producing a sulphethylic acid. Naturally these substituents have to be separated out again after the oxidation to obtain the desired aldehyde. In the present process, however, it is perfectly immaterial whether the phenol group is blocked or not, and it is therefore not necessary to start with blocked phenols in the oxidation. Hence the tedious and costly intermediate reactions mentioned are avoided and in spite thereof materially higher yields of aldehydes are obtained, owing to the avoidance of resinification. Moreover, the purity of the starting materials is not of absolute necessity with the present process.

The reaction takes place in all cases according to one of the following equations:

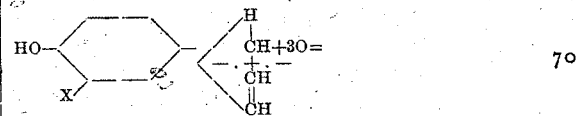

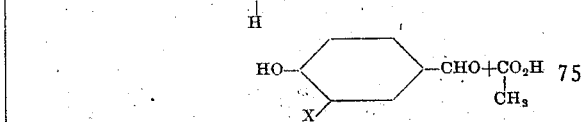

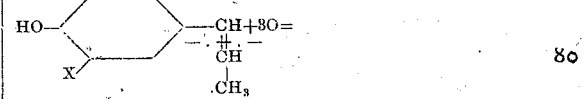

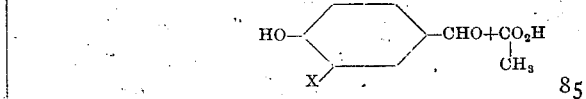

Accordingly there results

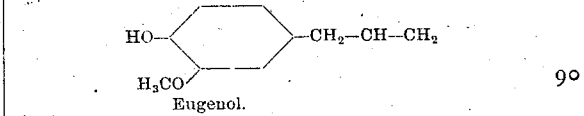
Eugenol.

(or)

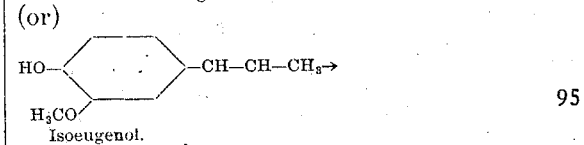
Isoeugenol.

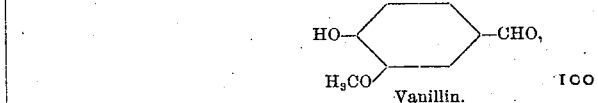
Vanillin.

The process covered by the present invention is carried out by bringing the vapors of the oxygen-transmitter with greater or lesser saturation to a temperature which may vary according to the nature of the body to be oxidized and causing them to sweep over the said body or simply in bubbles through its mass or else through porous substances by which the bodies have been absorbed, the temperature being increased or maintained at a normal height. The movement of the vapors is of course effected by means of a purified dry or moist current of air.

As a practical example the production of vanillin according to the present invention is described below.

A current of air freed from nitrous combinations and carbonic acid is passed through oil of turpentine, which, according to the degree of viscosity, has been heated to 30° to 35° centigrade. Next the current is conducted through a suitable column, kept at 80° to 90° centigrade with heated plates, against which the fumes strike, and then over a flat layer of isoeugenol maintained at about 100° centigrade. The speed is one hundred and twenty-five liters of effective air per hour, and the length of the operation is governed by the quantity of vanillin to be produced, which may be up to forty-two per cent. for the first treatment. The isolation of vanillin can be effected as usual with the aid of the bisulfite compound. For the oxidation of compounds containing the allyl group the same process may be used. It has been found advantageous, however, to use in place of air a mixture (free from nitrogen) of oxygen one-third and carbonic anhydrid two-thirds. It is also well in this case to have the compound to be oxidized neutral or feebly alkaline. The gas mixture not spent in action may be again and again passed through the emulsion by means of a pump or similar arrangement.

Outside of oil of turpentine all other bodies of the terpin series may be employed which activate or energize oxygen in a similar manner, such as Venice turpentine, Canada balsam, Burgundy pitch, residues from the distillation of turpentine, certain resins, &c. They may be used alone or in suitable solution or else mixed with water.

Having thus described my invention, I claim as new and desire to secure by Letters Patent—

The method herein described of manufacturing vanillin and similar aromatic aldehydes containing a free phenol group, which consists in subjecting bivalent phenols to the action of oxygen in the presence of terpins as described.

The foregoing specification of my improved process for the manufacture of vanillin and other analogous bodies signed by me this 5th day of June, 1902.

EDOUARD LOUIS FROGER-DELAPIERRE. [L. S.]

Witnesses:
SIMEON HONORÉ MARIE CRELB,
CHARLES ADOLPHE FELKER.